(12) United States Patent
Perez (10) Patent No.: US 9,285,136 B1
(45) Date of Patent: Mar. 15, 2016

(54) FILTER ASSEMBLY COMPRISING A TRUNCATED PYRAMIDAL FRAME

(71) Applicant: Jose Perez, Waxhaw, NC (US)

(72) Inventor: Jose Perez, Waxhaw, NC (US)

(*) Notice: Subject to any disclaimer, the term of this patent is extended or adjusted under 35 U.S.C. 154(b) by 0 days.

(21) Appl. No.: 14/729,777

(22) Filed: Jun. 3, 2015

Related U.S. Application Data (60) Provisional application No. 62/007,172, filed on Jun. 3, 2014.

(51) Int. Cl.
*F24F 13/28* (2006.01)
*B01D 46/00* (2006.01)
*B01D 46/52* (2006.01)

(52) U.S. Cl.
CPC .............. *F24F 13/28* (2013.01); *B01D 46/005* (2013.01); *B01D 46/521* (2013.01)

(58) Field of Classification Search
CPC .... F24F 13/28; B01D 46/0005; B01D 46/521
USPC .......................................................... 55/495
See application file for complete search history.

(56) References Cited

U.S. PATENT DOCUMENTS

| | | | | |
|---|---|---|---|---|
| 3,938,973 A * | 2/1976 | Kershaw | ........................ | 55/501 |
| 4,206,054 A * | 6/1980 | Moore et al. | ............. | 210/167.23 |
| 4,426,287 A * | 1/1984 | Narumiya | ..................... | 210/184 |
| 4,636,233 A * | 1/1987 | Lizmore | ......................... | 55/501 |
| 5,800,588 A * | 9/1998 | Miller | .............................. | 55/494 |
| 5,814,117 A * | 9/1998 | Mochida | ...................... | 55/385.3 |
| 6,033,454 A * | 3/2000 | Hoeffken | ....................... | 55/494 |
| 6,797,042 B2 * | 9/2004 | LaFerriere et al. | ............. | 95/273 |
| 8,870,995 B1 * | 10/2014 | Bender | .......................... | 55/508 |
| 2007/0204573 A1 * | 9/2007 | Justice | ............................ | 55/495 |
| 2007/0271887 A1 * | 11/2007 | Osborne et al. | ................. | 55/495 |
| 2007/0289271 A1 * | 12/2007 | Justice et al. | ................... | 55/495 |
| 2007/0289272 A1 * | 12/2007 | Justice | ............................ | 55/495 |
| 2008/0064319 A1 * | 3/2008 | Chezick | ........................ | 454/341 |
| 2009/0152181 A1 * | 6/2009 | Happel et al. | ................. | 210/162 |
| 2009/0183474 A1 * | 7/2009 | Workman | ..................... | 55/385.2 |
| 2009/0183477 A1 * | 7/2009 | Workman | ....................... | 55/495 |
| 2011/0308210 A1 * | 12/2011 | Crabtree et al. | ................ | 55/483 |
| 2014/0223872 A1 * | 8/2014 | Bao et al. | ......................... | 55/486 |
| 2014/0237957 A1 * | 8/2014 | Kohn et al. | ................... | 55/341.1 |
| 2014/0318092 A1 * | 10/2014 | Rieger et al. | .................... | 55/511 |

* cited by examiner

*Primary Examiner* — Amber R Orlando
*Assistant Examiner* — Britanny Precht
(74) *Attorney, Agent, or Firm* — Schwartz Law Firm, P.C.

(57) ABSTRACT

A filter assembly is adapted for separating particulate matter entrained in a moving fluid stream. The filter assembly comprises a flow-through three dimensional filter frame including a plurality of joined side walls, and having first and second opposing open faces. The first open face defines a fluid inlet into which the moving fluid stream is drawn, and the second open face defines a fluid outlet from which the moving fluid stream passes. At least one of the joined side walls is inwardly angled from the first open face to the second open face, such that the fluid outlet is smaller than the fluid inlet. A filtration medium is supported within the filter frame, and extends between the joined side walls and from the first open face to the second open face.

20 Claims, 7 Drawing Sheets

FILTER ASSEMBLY COMPRISING A TRUNCATED PYRAMIDAL FRAME

TECHNICAL FIELD AND BACKGROUND OF THE INVENTION

This invention relates broadly and generally to fluid (e.g., air) filters for residential, commercial, and industrial applications. In one exemplary embodiment, the invention comprises a deep pleated air filter assembly incorporating a unique truncated pyramidal frame design. The present pyramidal frame design allows the filter assembly to be installed in standard 1 and 2 inch nominal filter grills used in most residential and commercial applications, while providing greatly increased media area compared to standard air filter products.

Most residential or commercial air filter applications incorporate a nominal 1 or 2 inch thick air filter. With the concern over the quality of the air that we breathe, increased efficiency air filter media have been developed and adopted by many air filter manufacturers. Typically, as air filter efficiency increases more media area is required to increase air flow through the filter (reduce pressure drop across the filter surface). Air filters with high pressure drop result in high energy consumption, as HVAC units work harder to achieve the desired room temperature.

Typically, the most direct approach of reducing air flow restriction is to add media surface area. For example, a pleated filter incorporates more media area than a flat panel filter. Increasing the pleat count per foot of filter length will also increase air filter media area. Current residential and commercial filter applications are limited when a large increase in filter media area is required. Specifically, filter manufacturers are limited in the amount of filter media that can be added in a 1 or 2 inch filter depth. Even with pleated media, bridging can occur when too much media is added, resulting in poor filter performance. Modifications to the existing filter grills or custom grill designs can provide the additional room required to accommodate larger air filter designs. In many cases however, extensive modifications to the HVAC systems are required.

The present invention addresses the challenge of increase media area while providing a simplified installation advantage. The unique frame design offers several advantages when compared to existing products. The invention installs in the same manner as most air filter applications and can be manufactured in paper, metal or plastic. The need for custom size filters may be reduce or substantially eliminated by the unique "wedge" frame design. An added benefit is an increased positive seal to the filter grill interface, thereby eliminating any significant air bypass. The invention also greatly increases the air filter media area. This increase in air filter media area allows for the use of more efficient filter media, and reduces air flow restriction thereby promoting longer filter life.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a filter assembly for separating particulate matter entrained in a moving fluid stream. The filter assembly comprises a flow-through three dimensional filter frame including a plurality of joined side walls, and having first and second opposing open faces. The first open face defines a fluid inlet into which the moving fluid stream is drawn, and the second open face defines a fluid outlet from which the moving fluid stream passes. At least one of the joined side walls is inwardly angled from the first open face to the second open face, such that the fluid inlet is larger than the fluid outlet. A filtration medium is supported within the filter frame, and extends between the joined side walls and from the first open face to the second open face. The filtration medium resides between the fluid inlet and the fluid outlet in fluid-filtering relation to the moving fluid stream.

The term "filtration medium" refers broadly herein to any particulate-capturing material, such as glass fibers and polyester fibers, and may incorporate any combination of integrated (wire or plastic) supports or stiffeners. In alternative embodiments of the disclosure, the exemplary filter assembly may comprise less than four side walls, or may be substantially frameless with a filtration medium having a generally self-supporting truncated pyramidal shape.

According to another exemplary embodiment, the filter frame comprises first and second pairs of opposing side walls. The side walls of each pair are of substantially equal length and width.

According to another exemplary embodiment, the opposing side walls of the first pair are each formed at substantially the same inward angle.

According to another exemplary embodiment, the inward angle of each side wall in the first pair is between about 3 and 8 degrees—the angle being measured relative to a notional plane substantially perpendicular to a planar face at the fluid inlet of the filter frame.

According to another exemplary embodiment, the opposing side walls of the second pair are each formed at substantially the same inward angle.

According to another exemplary embodiment, the inward angle of each opposing side wall in the second pair is between about 3 and 8 degrees—the angle being measured relative to a notional plane substantially perpendicular to a planar face at the fluid inlet of the filter frame.

According to another exemplary embodiment, the filter frame has a truncated substantially pyramidal shape.

According to another exemplary embodiment, the first and second open faces of the filter frame are substantially rectangular, and are formed in respective parallel planes.

According to another exemplary embodiment, the filter frame is capable of dividing into two symmetrical halves at an axis of symmetry.

According to another exemplary embodiment, the filtration medium is pleated and extends substantially from the first open face to the second open face of the filter frame.

According to another exemplary embodiment, the side walls are constructed of a solid continuous-surface paper stock. Alternatively, the side walls may be fabricated of other suitable materials including metal and plastic, or any combination of metal, plastic, and paper.

In another exemplary embodiment, the present disclosure comprises a building HVAC system including an air duct communicating with a fan, a filter holding frame located at an opening of the air duct, and a filter assembly carried by the filter holding frame. The filter assembly comprises a flow-through three dimensional filter frame having a truncated substantially pyramidal shape. The filter frame includes a plurality of joined inwardly angled side walls, and has first and second opposing and substantially rectangular open faces. The first open face defines a relatively large fluid inlet into which the moving fluid stream is drawn, and the second open face defines a smaller fluid outlet from which the moving fluid stream passes. A filtration medium is supported within the filter frame, and extends between the joined side walls and from the first open face to the second open face. The filtration medium resides between the fluid inlet and the fluid outlet in fluid-filtering relation to the moving fluid stream.

The term "filter holding frame" refers broadly herein to the structure into which a filter assembly is positioned. The filter holding frame may include a conventional return air "grille"—an opening of several slits side by side in a wall or metal sheet or other barrier.

BRIEF DESCRIPTION OF THE DRAWINGS

Exemplary embodiments of the present invention will hereinafter be described in conjunction with the following drawing figures, wherein like numerals denote like elements.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
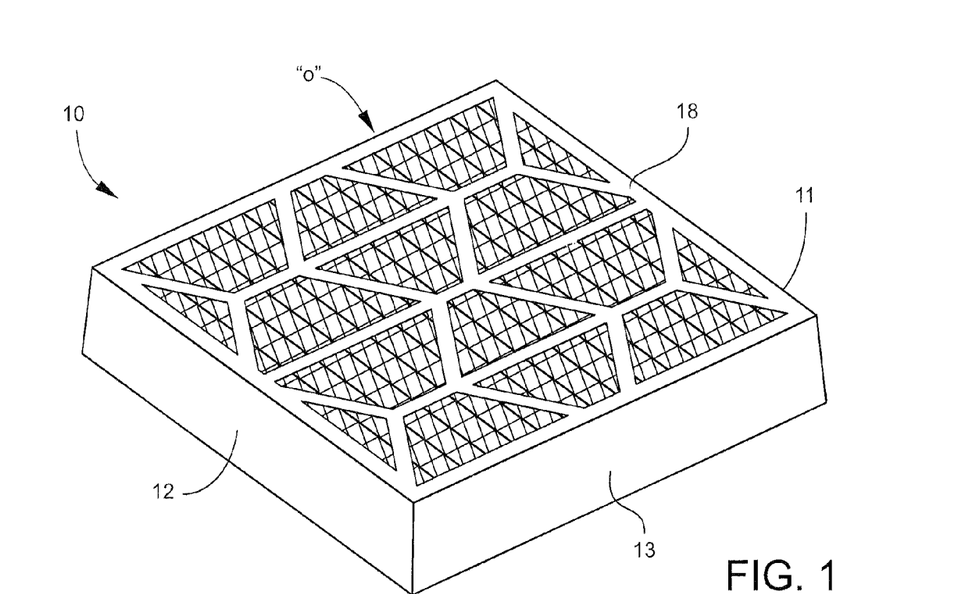
FIG. 1 is a perspective view of a replacement air filter assembly according to one exemplary embodiment of the present disclosure.
Figure 2:
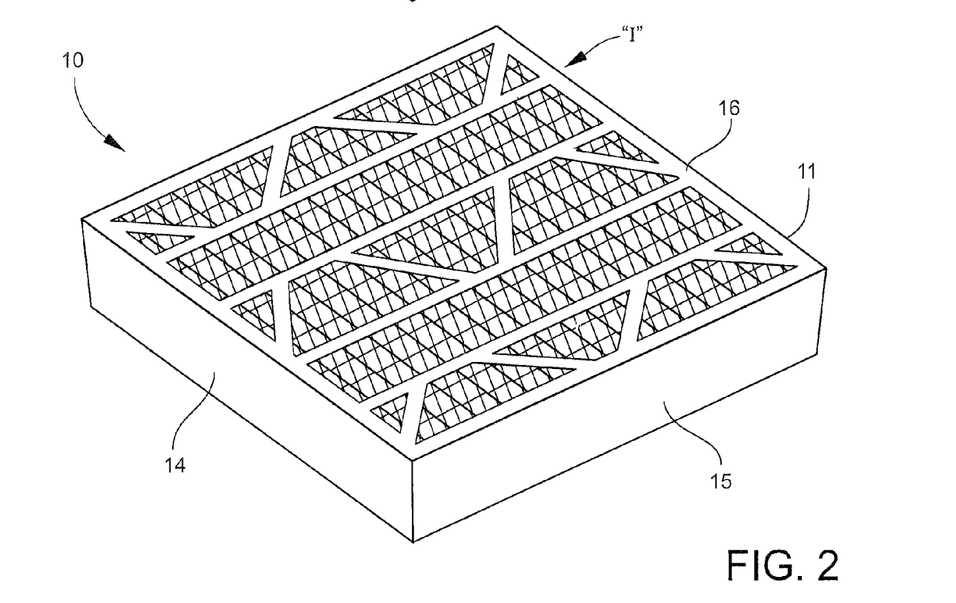
FIG. 2 is a further perspective view of the exemplary air filter assembly.
Figure 5:
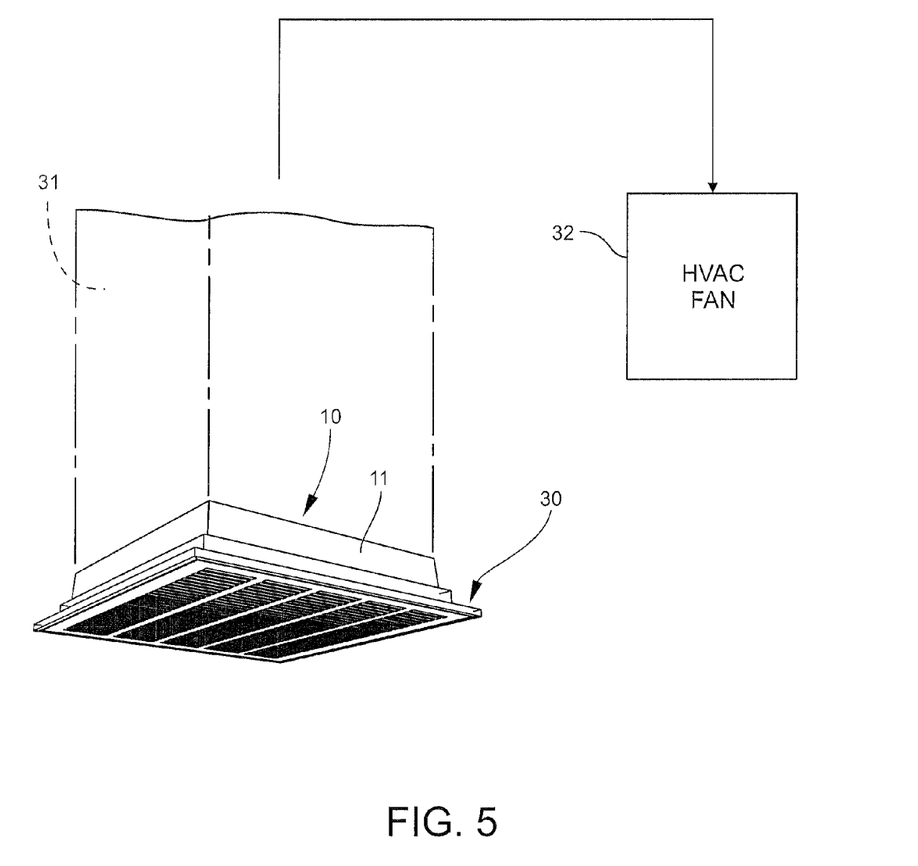
FIG. 5 is a schematic view illustrating the exemplary filter assembly and various components of a building HVAC system.
Figure 6:
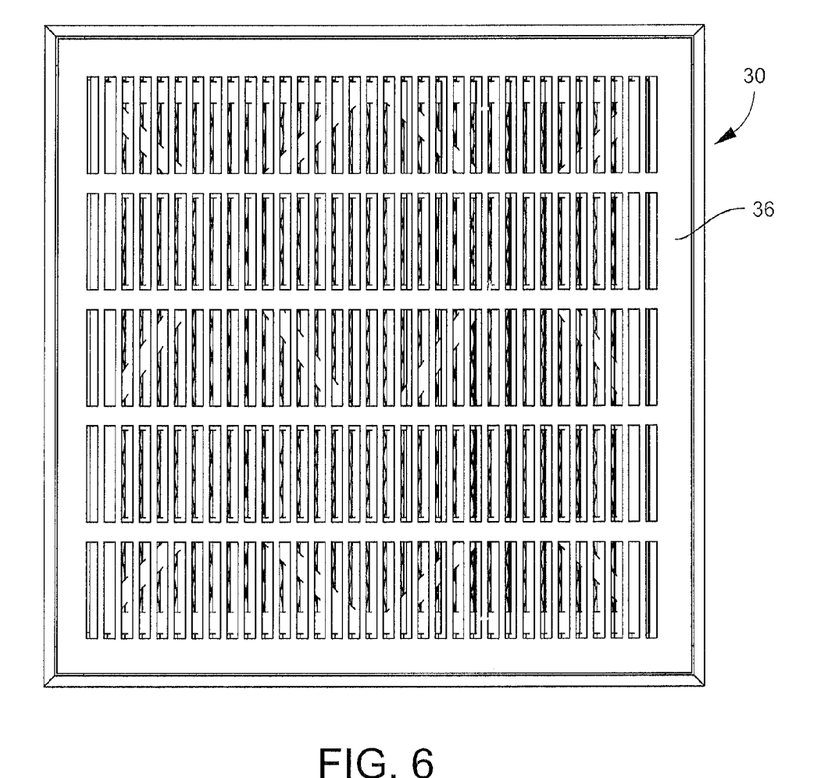
FIG. 6 is a view showing the exemplary filter assembly installed in a return air grille.

Referring now specifically to the drawings, a replacement air filter assembly according to one exemplary embodiment of the present disclosure is illustrated in FIGS. 1 and 2, and shown at broad reference numeral 10. The exemplary filter assembly 10 comprises a flow-through (truncated) pyramidal shaped filter frame 11 having inwardly angled side walls 12, 13, 14, and 15, and defining opposing first and second substantially open planar faces 16 and 18. The side walls 12-15 are constructed of a solid surface paper sheet stock (or suitable plastic or sheet metal), and are integrally joined together to form a substantially air-impervious outside periphery of the filter assembly 10. The first open face 16 defines an air inlet "I" into which a moving air stream is drawn (e.g., by fan or blower; FIG. 5), while the second open face 18 defines an air outlet "O" from which the moving air stream passes.

Figure 3:
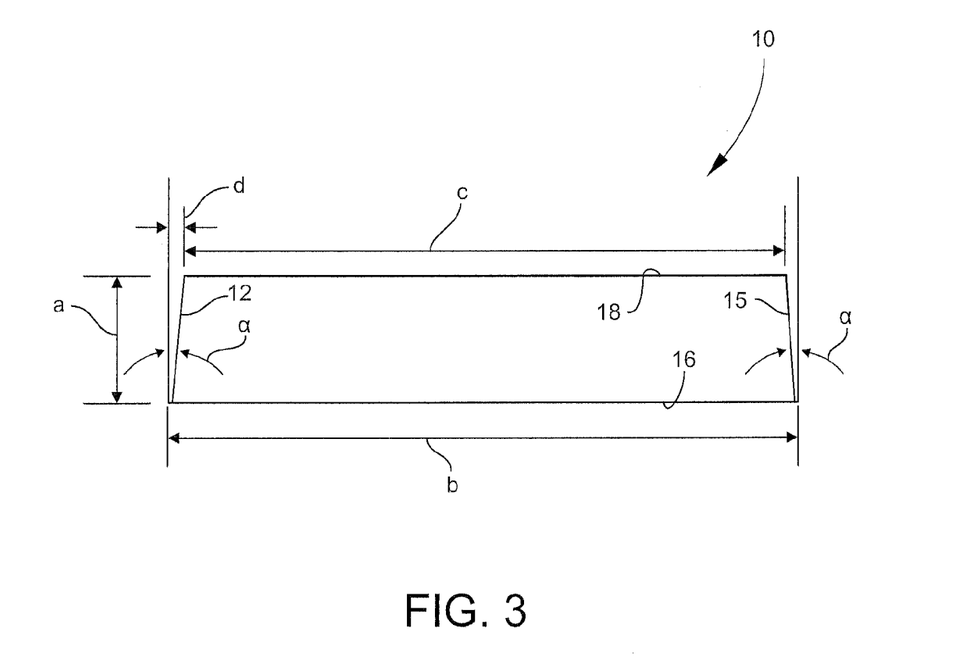
FIG. 3 is a side view of the exemplary air filter assembly.

The truncated pyramidal design of the exemplary filter assembly 10 is best illustrated in FIG. 3. As shown, the side walls 12-15 of filter frame 11 angle inwardly from the planar inlet face 16 to the opposing planar outlet face 18, such that the air inlet "I" is larger than the air outlet "O". In an exemplary nominal 20×20×4 filter assembly, the depth (a) of the filter frame 11 is approximately 3.75 inches, the length/width (b) at the inlet face 16 is approximately 19.06 inches, and the length/width (c) at the outlet face 18 is approximately 18.50 inches. The difference between (b) and (c) equals twice (d). The gradient of each side wall 12-15 is calculated by dividing (d) by (a)—or 0.28/3.75. This gives a gradient of 0.075. The angle of inclination (a) equals the inverse sine of 0.075—or 4.3 degrees. In the exemplary filter frame 11, each side wall 12-15 has substantially the same angle of inclination ranging between 3 and 8 degrees.

Figure 4:
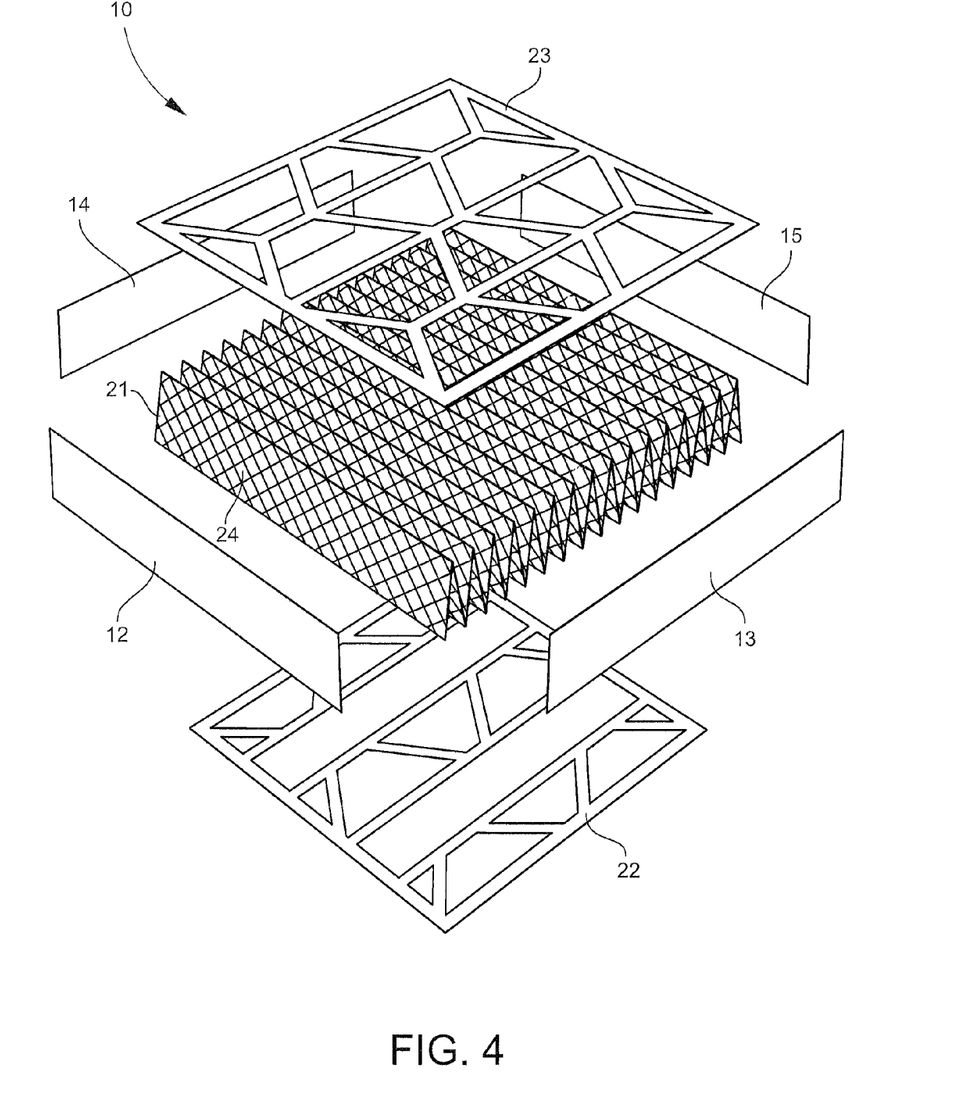
FIG. 4 is a perspective view of the exemplary air filter assembly with various components exploded.

As best shown in FIGS. 1, 2 and 4, a deep-pleated filtration medium 21 is located inside the filter frame 11, and extends entirely between the joined side walls 12-15 and from the first open face 16 to the second open face 18 of the filter assembly 10. The filtration medium 21 is supported by opposing perforated face covers 22, 23 joined to the side walls 12-15, and standard integrated light gauge metal wire 24 (or filter pack). The exemplary filter frame 11 may be constructed of any suitable depth to accommodate filtration media having pleated depths of 3 to 6 inches or more. In one exemplary embodiment, the filtration medium 21 is fabricated of a bi-directional 100% synthetic material, such as non-woven polyester or a progressively dense fiberglass. With its deep-pleated generally pyramidal construction, the present filter assembly 10 may offer increased dust-holding capacity (with an exemplary MERV rating of between 8-13), and with substantially reduced pressure drop from the air inlet face 16 through the air outlet face 18. In alternative embodiments, the present pyramidal frame 11 may be incorporated in other types of filters including electrostatic filters, HEPA filters, carbon filters, electrostatic filters, and others. Filter assemblies comprising the present pyramidal frame 11 may have several applications including single stage filtration units, two stage filtration units, pre-filters, and final stage filters.

Figure 7:
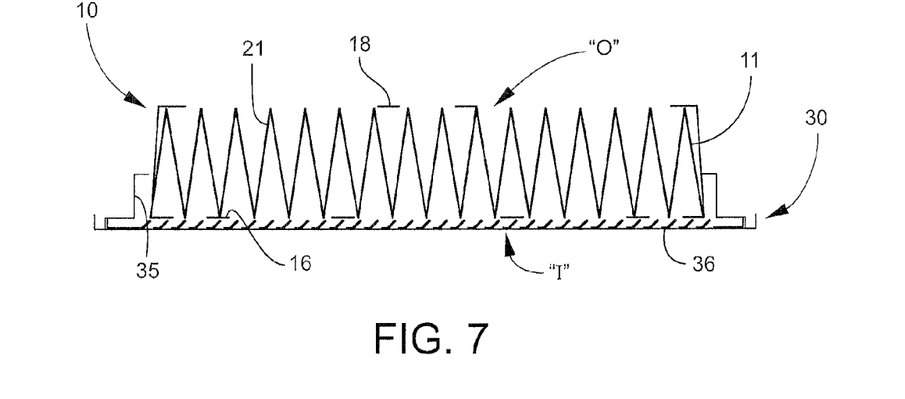
FIG. 7 is a cross-sectional view taken substantially along line 6-6 of FIG. 6.
Figure 8:
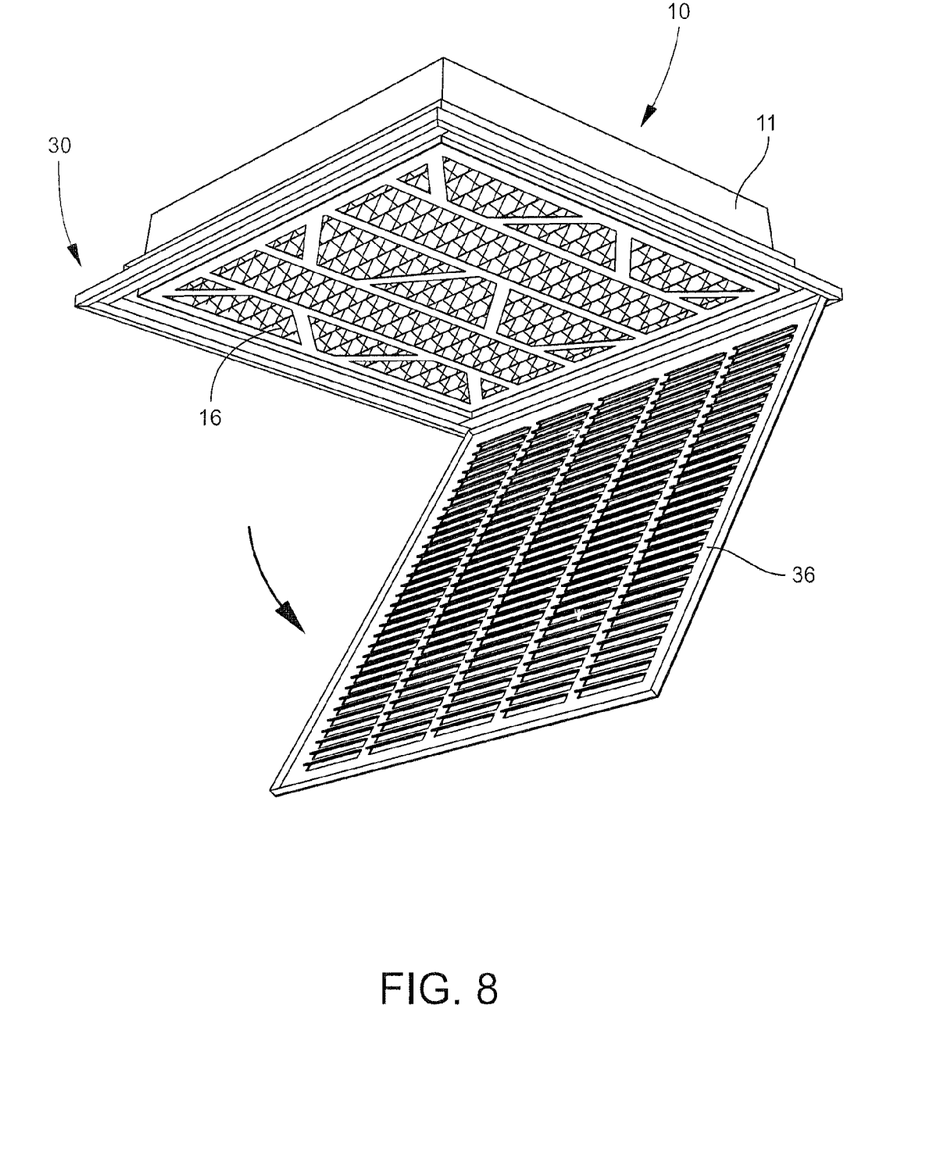
FIGS. 8 and 9 are sequential views demonstrating removal and replacement of the exemplary air filter assembly.
Figure 9:
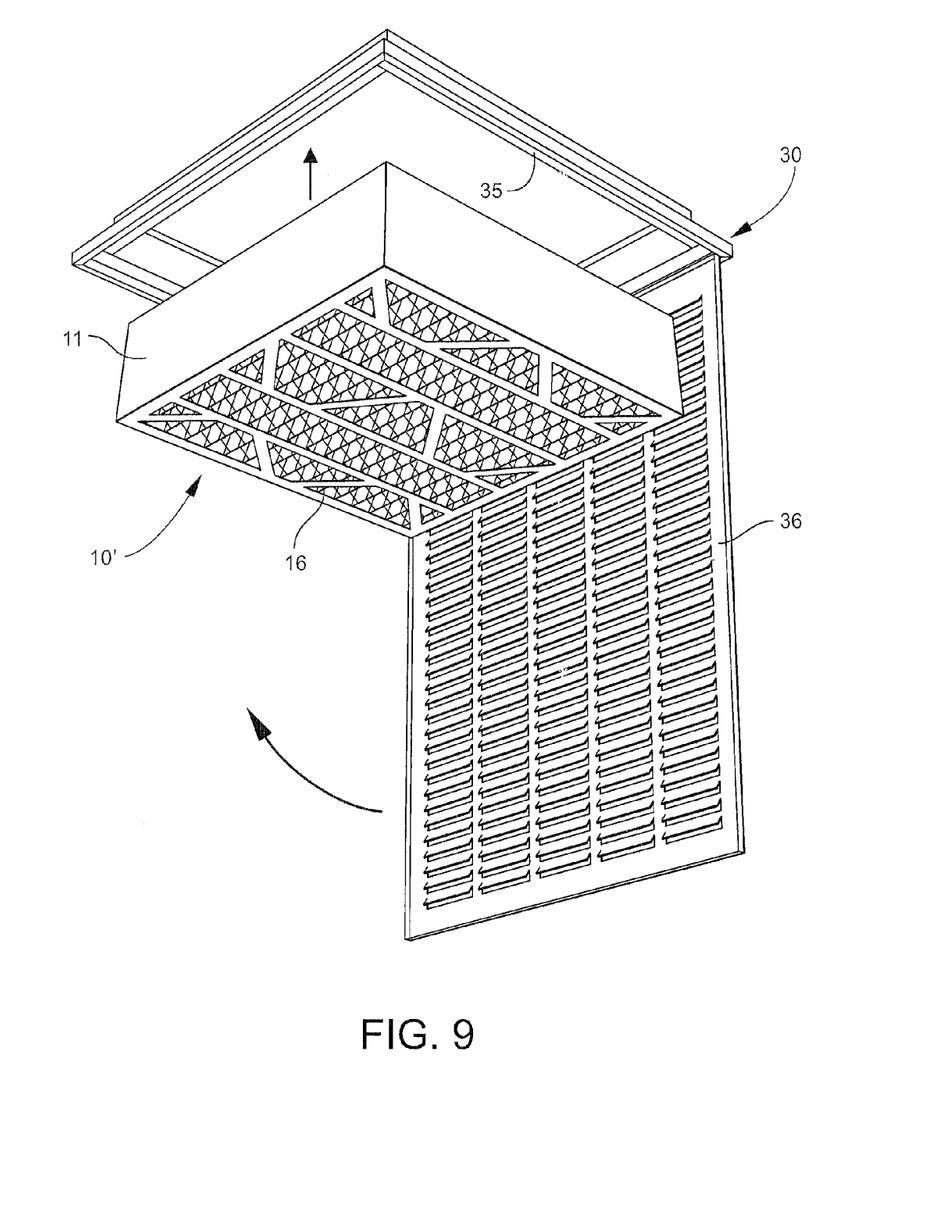

Referring to FIGS. 5-9, the exemplary filter assembly 10 is adapted for residing within a conventional 1-2 inch residential return air grille 30 (or other filter holding frame) in a building HVAC system. See FIGS. 6 and 7. The HVAC system comprises an air duct 31 extending from the return air grille 30 and communicating with an HVAC fan 32 (or blower) to draw a moving airstream into and through the replacement filter assembly 10. As best shown in FIG. 7, given its substantially pyramidal frame 11, the exemplary filter assembly 10 provides a generally universal tight fit within the grille opening 35 and eliminates any significant air bypass around filtration medium 21 from the air inlet "I" at open face 16 through the air outlet "O" at open face 18. After a period of time (typically 60-120 days), the exemplary filter assembly 10 may be removed from the return air grille 30 by opening a pivoted grille cover 36, as demonstrated in FIG. 8, and then replaced with a fresh assembly 10', as demonstrated in FIG. 9.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A filter assembly for separating particulate matter entrained in a moving air stream, and carried by a filter holding frame at a duct opening of a building HVAC duct, said filter assembly comprising:
   a flow-through three dimensional filter frame including a plurality of joined side walls adapted to reside closely adjacent the filter holding frame at the duct opening, and having first and second opposing open faces, said first open face being positioned towards an outside of the HVAC duct and defining a air inlet into which the moving air stream is drawn, and said second open face being positioned towards an inside of the HVAC duct and defining a air outlet from which the moving air stream passes, and wherein at least one of said joined side walls is inwardly angled from said first open face to said second open face, such that said air inlet is larger than said air outlet, and whereby said joined side walls cooperate to form said air outlet at a point inside the HVAC duct and spaced apart from the filter holding frame; and
   a filtration medium supported within said filter frame and extending between said joined side walls and from said first open face to said second open face, whereby said filtration medium resides between said air inlet and said air outlet in fluid-filtering relation to the moving air stream, and wherein a surface area of said filtration medium at said air inlet is greater than a surface area of said filtration medium at said air outlet.

2. The filter assembly according to claim 1, wherein said filter frame comprises first and second pairs of opposing side walls, and said walls of each pair being of substantially equal length and width.

3. The filter assembly according to claim 2, wherein the opposing side walls of said first pair are each formed at substantially the same inward angle.

4. The filter assembly according to claim 3, wherein the inward angle of each side wall in said first pair is between about 3 and 8 degrees.

5. The filter assembly according to claim 2, wherein the opposing side walls of said second pair are each formed at substantially the same inward angle.

6. The filter assembly according to claim 5, wherein the inward angle of each opposing side wall in said second pair is between about 3 and 8 degrees.

7. The filter assembly according to claim 1, wherein said filter frame has a truncated substantially pyramidal shape.

8. The filter assembly according to claim 7, and wherein said first and second open faces of said filter frame are substantially rectangular, and are formed in respective parallel planes.

9. The filter assembly according to claim 1, wherein said filter frame is capable of dividing into two symmetrical halves at an axis of symmetry.

10. The filter assembly according to claim 1, wherein said filtration medium is pleated and extends substantially from said first open face to said second open face of said filter frame.

11. The filter assembly according to claim 1, wherein said side walls are constructed of a solid continuous-surface paper stock.

12. A filter assembly for separating particulate matter entrained in a moving air stream, and carried by a filter holding frame at a duct opening of a building HVAC duct, said filter assembly comprising:
- a flow-through substantially pyramidal shaped filter frame including a plurality of joined inwardly angled side walls adapted to reside closely adjacent the filter holding frame at the duct opening, and having first, and second opposing and substantially rectangular open faces, said first open face being positioned towards an outside of the HVAC duct and comprising a relatively large air inlet into which the moving air stream is drawn and said second open face being positioned towards an inside of the HVAC duct and comprising a smaller air outlet from which the moving air stream passes, and whereby said joined side walls cooperate to form said air outlet at a point inside the HVAC duct and spaced apart from the filter holding frame; and
- a filtration medium supported within said filter frame and extending between said joined side walls and from said first open face to said second open face, whereby said filtration medium resides between said air inlet and said air outlet in fluid-filtering relation to the moving air stream, and wherein a surface area of said filtration medium at said air inlet is greater than a surface area of said filtration medium at said air outlet.

13. The filter assembly according to claim 12, wherein the inward angle of each side wall is between about 3 and 8 degrees.

14. The filter assembly according to claim 12, wherein said filtration medium is pleated and extends substantially from said first open face to said second open face of said filter frame.

15. The filter assembly according to claim 12, wherein said side walls are constructed of a solid continuous-surface paper stock.

16. A building HVAC system comprising an air duct communicating with a fan, a filter holding frame located at an opening of said air duct, and a filter assembly carried by said filter holding frame, said filter assembly comprising:
- a flow-through three dimensional filter frame including a plurality of joined side walls residing closely adjacent said filter holding frame at the opening of said air duct, and having first and second opposing open faces, said first open face positioned towards an outside of said air duct and defining a air inlet into which the moving air stream is drawn and said second open face positioned towards an inside of said air duct and defining a air outlet from which the moving air stream passes, and whereby said joined side walls cooperate to form said air outlet at a point inside said duct and spaced apart from the filter holding frame, and wherein at least one of said joined side walls is inwardly angled from said first open face to said second open face, such that said air outlet is smaller than said air inlet; and
- a filtration medium supported within said filter frame and extending between said joined side walls and from said first open face to said second open face, whereby said filtration medium resides between said air inlet and said air outlet in fluid-filtering relation to the moving air stream, and wherein a surface area of said filtration medium at said air inlet is greater than a surface area of said filtration medium at said air outlet.

17. The filter assembly according to claim 16, wherein said filter frame has a truncated substantially pyramidal shape.

18. The filter assembly according to claim 17, and wherein said first and second open faces of said filter frame are substantially rectangular, and are formed in respective parallel planes.

19. The filter assembly according to claim 16, wherein said filtration medium is pleated and extends substantially from said first open face to said second open face of said filter frame.

20. The filter assembly according to claim 16, wherein said side walls are constructed of a solid continuous-surface paper stock.

\* \* \* \* \*